(12) United States Patent
Secatch et al.

(10) Patent No.: US 7,057,546 B1
(45) Date of Patent: Jun. 6, 2006

(54) BINARY PRIORITY ENCODER

(75) Inventors: Stacey Secatch, Niwot, CO (US); James E. Ogden, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 154 days.

(21) Appl. No.: 10/871,072

(22) Filed: Jun. 18, 2004

(51) Int. Cl.
*H03M 1/36* (2006.01)

(52) U.S. Cl. ...................... 341/160; 341/159

(58) Field of Classification Search ........... 341/159, 341/160, 50, 79, 142; 326/37–41; 365/49
See application file for complete search history.

(56) References Cited

U.S. PATENT DOCUMENTS

| | | | | |
|---|---|---|---|---|
| 4,998,219 A * | 3/1991 | Frauenglass | ................. | 708/207 |
| 5,555,397 A * | 9/1996 | Sasama et al. | .............. | 711/158 |
| 5,995,028 A * | 11/1999 | Tai | ............... | 341/100 |
| 6,307,767 B1 * | 10/2001 | Fuh | ................ | 365/49 |
| 6,362,992 B1 * | 3/2002 | Cheng | ................ | 365/49 |
| 6,388,602 B1 * | 5/2002 | Yang | ................ | 341/159 |
| 6,420,990 B1 * | 7/2002 | Voelkel | ................ | 341/160 |
| 6,462,694 B1 * | 10/2002 | Miyatake | ................ | 341/160 |
| 6,542,104 B1 * | 4/2003 | Capofreddi | ................ | 341/160 |
| 6,621,295 B1 * | 9/2003 | James-Roxby et al. | ....... | 326/38 |
| 6,633,250 B1 * | 10/2003 | Lee et al. | ................ | 341/160 |
| 6,696,988 B1 * | 2/2004 | Chen | ................ | 341/50 |
| 6,831,587 B1 * | 12/2004 | Joshi | ................ | 341/160 |

* cited by examiner

*Primary Examiner*—Linh V. Nguyen
(74) *Attorney, Agent, or Firm*—W. Eric Webostad

(57) ABSTRACT

Apparatuses for binary priority encoding are described. A binary priority encoder (100, 100L) includes a data input bus (139), a first logic tree (110) coupled to receive data from the input bus (139), and a second logic tree (130) coupled to receive a portion of the data from the input bus (139). The first logic tree (110) is configured to provide a flag signal (154) indicating whether at least one bit of the data is active. The first logic tree (110) is configured to provide control signals. The second logic tree (130) is coupled to receive the control signals. The second logic tree (130) is configured to select first partial addresses from the portion of the data responsive to the control signals. The control signals are further provided to the second logic tree (130) as second partial addresses.

27 Claims, 6 Drawing Sheets

BINARY PRIORITY ENCODER

FIELD OF THE INVENTION

One or more aspects of the invention relate generally to encoding and, more particularly, to binary priority encoding.

BACKGROUND OF THE INVENTION

Data input to a binary encoder is conventionally from an n-bit bus, for n an even integer greater than zero. The data input may be what is known as "one-hot" data. "One-hot" data includes all data input bits being inactive except for one bit which is active. Conventionally, inactive bits are represented as binary zeros, and the active bit is represented as a binary one. Data input to a binary encoder is converted or encoded into a binary address of length log n to the base two (i.e., $\log_2 n$).

In contrast, data input to a priority encoder, conventionally from an n-bit bus, has one or more active bits. A priority encoder is configured to determine which of the n-bits has the highest priority, which is more problematic when more than one bit is active. A highest priority determination is made using a set of rules. Moreover, highest priority may be based either on the most significant bit ("MSB") or the least significant bit ("LSB"). Output of a priority encoder may drive control signaling or may be represented as a one-hot output bus. With respect to the later embodiment, a one-hot output bus conventionally will have the one active bit in the same location as the bit of highest priority in the n-bit input bus.

A conventional binary encoder receives one-hot data to derive a binary output address. For example, if the active bit is found in an odd location, then the resulting address will be odd. The conventional binary encoder may be configured to set the lowest output bit active responsive to a resulting address being odd. However, this will not result in correct functionality if the n-bit input bus has multiple bits that are logic high because these logic high bits will start to interfere with each other in the address calculation tree or trees. For example, there may be active bits in odd locations resulting in an odd output address, even though the highest priority address may actually be even. Thus, the output result may be for an address that does not have an active bit set, i.e., aliasing.

To avoid aliasing as described in the preceding paragraph, heretofore a two-tier calculation was done. The first tier generates a one-hot address using a priority encoder. The one-hot address is used in the second tier, where a binary encoder using the one-hot address from the first tier, generates a binary address. Thus, conventionally two tiers were used to take a binary address from an n-bit input and convert it to a highest priority address. These two tiers may mean that: clock cycle time may have to be extended if both priority encoding and binary encoding are done in one clock cycle; or two clock cycles may be needed if priority encoding and binary encoding are pipelined.

Both a priority encoder and a binary encoder use complete input busing to calculate their respective outputs. For example, the lowest priority bit of a one-hot calculation is only active when the input bit at that same location is active and every other input bit is inactive. Likewise, the lowest address bit in a binary address is active when the binary address is odd. Therefore, every odd bit resulting from a one-hot calculation conventionally is examined to determine if the lowest address should be active. In short, this means that implementing a priority encoder and a binary encoder to convert a binary address from an n-bit input to a priority address for n equal to eight or more involves a significant number of signals being routed to multiple destinations for independent calculations. Such routing may result in additional signal delay causing a lowering of frequency of operation, place and route runtime, and delay due to an increase in non-deterministic parasitic capacitive coupling.

Accordingly, it would be desirable to provide conversion of a binary address from an n-bit input to a priority address that avoids or reduces one or more of the above-mentioned limitations.

SUMMARY OF THE INVENTION

An aspect of the invention is a binary priority encoder, including: a data input bus; a first logic tree coupled to receive data from the input bus; and a second logic tree coupled to receive a portion of the data from the input bus. The first logic tree is configured to provide a flag signal indicating whether at least one bit of the data is active. The first logic tree is configured to provide control signals. The second logic tree is coupled to receive the control signals. The second logic tree is configured to select first partial addresses from the portion of the data responsive to the control signals. The control signals are further provided to the second logic tree as second partial addresses.

Another aspect of the present invention includes a method for encoding a plurality of bits. The method includes, first dividing the plurality of bits into a first multiple of two-bit sets. Next, the first two-bit sets are recombined (via, for example, an OR function) to form a second multiple of two-bit sets. Then using a high bit of a two-bit set of the second multiple of two-bit sets, a high bit of a two-bit set of the first multiple of two-bit sets is selected (via, for example, a multiplexer).

BRIEF DESCRIPTION OF THE DRAWINGS

Accompanying drawing(s) show exemplary embodiment (s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1A:
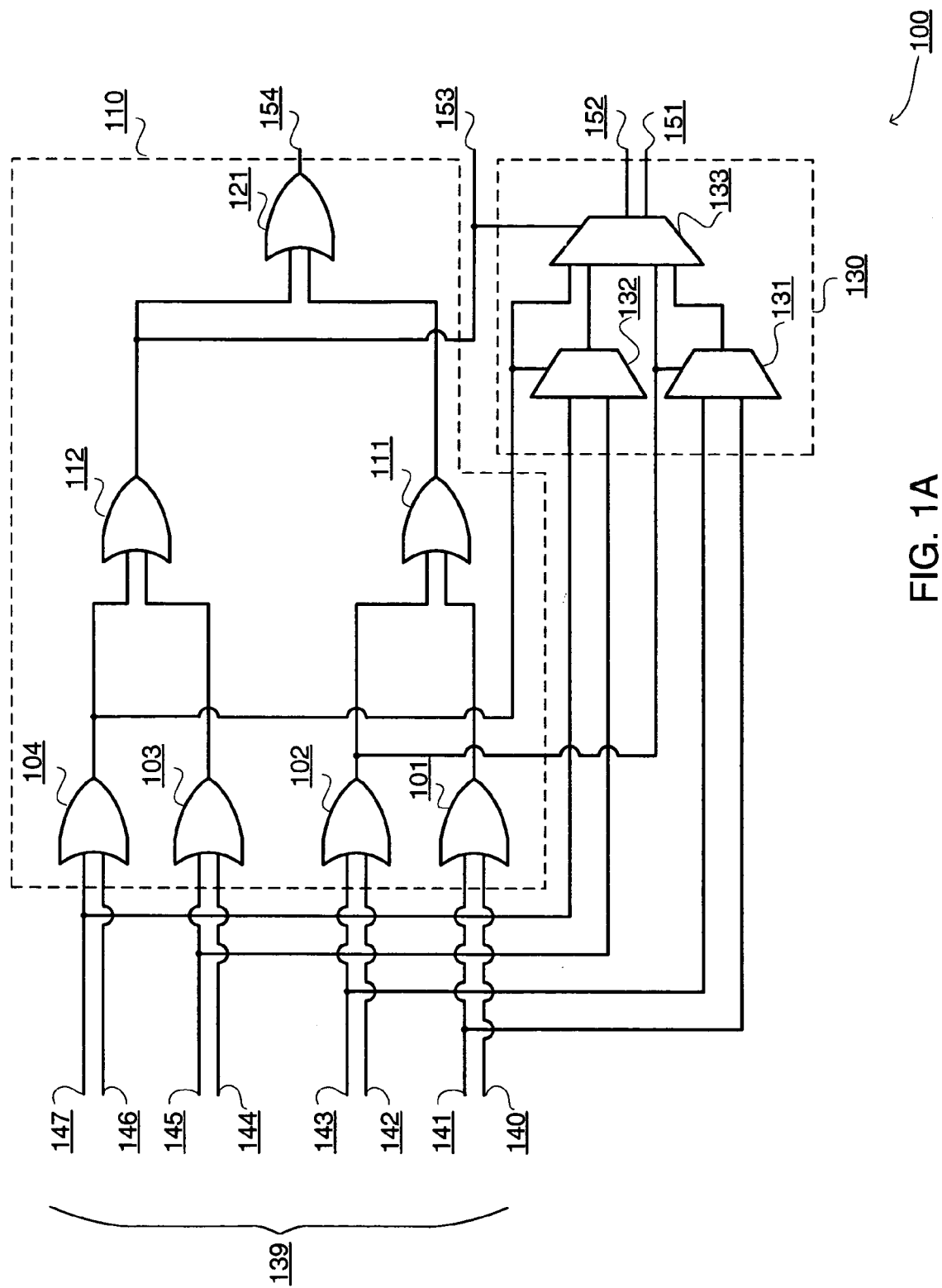
FIG. 1A is a schematic diagram depicting an exemplary embodiment of a binary priority encoder.

FIG. 1A is a schematic diagram depicting an exemplary embodiment of a binary priority encoder 100. Binary priority encoder 100 includes OR gate tree 110 and multiplexer tree 130. Multiplexer tree 130 is coupled in parallel with OR gate tree 110 for at least a portion of the data inputs to OR gate tree 110. Thus, it should be immediately apparent that latency is reduced or removed by parallel processing.

Input bus 139 is recursively divided into halves. Results from each half are combined to determine a binary address for that half. For example, recursive division is done on at least a 2-bit signal. Possible results for a recursively divided input of a 2-bit bit width are shown below in Table I. Input bus data with value "00" has no defined binary encoded address since no bits are active. It is convenient to define input bus data "00" as address [0] for this case. In other words, there is no one-hot bit, so the data is not found anywhere so just define that address as "0". Notably, address [0] for input bus data "00" may be thought of as a "don't care condition" as indicated by the symbol "X" in Table I. For input bus data with a value of 01, the address [0] is defined as the lower priority bit and is one-hot. The 1-detected flag for this address [0] will be a binary 1, which delineates this address from input bus data "00". In other words, if there is not at least one-hot bit, namely, input bus data "00", then the 1-detected flag will be 0. For input bus data with a value of 10 or 11, the defined address [1] is used as the higher priority and is one-hot. Notably, this is a high priority embodiment. Thus, as long as there is data in the higher priority bit place, as in input bus data "10" and "11", then one need not care if there is no data in the lower priority bit place. In other words, input bus data "10" may be thought of as "1X" where X is a symbol of a don't care condition. Alternatively, a low priority embodiment may be used, as will become more apparent.

TABLE I

| Input bus | Address | 1 Detected |
|---|---|---|
| 00 | 0 (X) | 0 |
| 01 | 0 | 1 |
| 10 | 1 | 1 |
| 11 | 1 | 1 |

Input data bus 139 includes data line inputs 140, 141, 142, 143, 144, 145, 146, and 147 ("140 through 147"), which may correspond to input data (0) through input data (7) with input data (0) being a lower order bit than input data (7). Notably, though an 8-bit wide data bus is described herein for purposes of clarity by way of example, it should be understood that bit widths less than or greater than eight may be used. Data line inputs 140 through 147 are input to OR gate tree 110 in data pairs. For example, data line inputs 140, 141 ("input data pair 1") are paired, data line inputs 142, 143 ("input data pair 2") are paired, data line inputs 144, 145 ("input data pair 3") are paired, and data line inputs 146, 147 ("input data pair 4") are paired. Each pair of data line inputs is coupled as data input to a respective OR gate, such as input data pairs 1 through 4 being respectively input to OR gates 101 through 104. Output from OR gates 101 through 104 form a first recursive division output stage of OR gate tree 110.

A data input of each input data pair 1 through 4 is provided to multiplexer tree 130. In this exemplary embodiment, data line inputs 141 and 143 are provided as data inputs to multiplexer 131 of multiplexer tree 130, and data line inputs 145 and 147 are provided as data inputs to multiplexer 132 of multiplexer tree 130. Multiplexers 131 and 132 provide a first recursive division stage of partial addresses of multiplexer tree 130.

Output from OR gate 102 is provided as a control select signal input to multiplexer 131, and output from OR gate 104 is provided as a control select signal input to multiplexer 132. Output from OR gate 102 is also provided as a data input to multiplexer 133 of multiplexer tree 130, and output from OR gate 104 is also provided as a data input to multiplexer 133 of multiplexer tree 130. An output from multiplexer 131 and an output from multiplexer 132 are provided as data inputs to multiplexer 133 of multiplexer tree 130. Accordingly, as will become more apparent, multiplexer tree 130 may be thought of as a "partial addresses" circuit.

Output from each of OR gates 101 and 102 ("output data pair 1") are provided as data inputs to OR gate 111 of OR gate tree 110. Output from each of OR gates 103 and 104 ("output data pair 2") are provided as data inputs to OR gate 112 of OR gate tree 110. Output from OR gates 111 and 112 form a second recursive division output stage of OR gate tree 110.

Output from OR gates 111 and 112 are provided as data input to OR gate 121 of OR gate tree 110. Output 154 from OR gate 121 forms a third and final recursive division output stage of OR gate tree 110. Output 154 is an output of binary priority encoder 100 which indicates whether at least one active bit was detected on input bus 139. In other words, if at least one bit on any of data line inputs 140 through 147 is at a logic one level, then output 154 will be a logic one level. If, however, no bit on any of date line inputs 140 through 147 is at a logic one level, then output 154 will be a logic zero level.

Output from OR gate 112 is also provided as an output 153 of binary priority encoder 100 and as a control select signal input to multiplexer 133. Output 153 is an address, namely, address [2].

Binary priority encoder 100 using multiplexer tree 130 does a recursive division and partial address calculation for every 2-bit pair of input data bus 139. Single bit addresses and 1-detected flags are passed from an input stage to a next stage for a calculation which in this example determines the address for each 4-bit segment.

A 1-detected active for the high pair indicates to use the high address. If the high pair 1-detected is inactive, the low address is used. The 1-detected for the high pair becomes the high bit for the next stage. For example, data line input 143 is a higher order than data line input 141. If data on data lines 142 or 143 is a logic one, then output of OR gate 102 will be a logic 1. Output of OR gate 102 being a logic 1 will select the higher order input, namely, data on data line input 143, of multiplexer 131 for output therefrom. If, however, data on both data lines 142 and 143 is a logic 0, then output of OR gate 102 will be a logic 0. Output of OR gate 102 being a logic 0 will select the lower order input, namely, data on data line input 141, of multiplexer 131 for output therefrom. Output from multiplexer 131 is a partial address, namely, "partial address signal 0(0)." Output from OR gate 102 is a partial address, namely, "partial address signal 0(1)."

For example, data line input 147 is a higher order than data line input 145. If data on data lines 147 or 146 is a logic one, then output of OR gate 104 will be a logic 1. Output of OR gate 104 being a logic 1 will select the higher order input, namely, data on data line input 147, of multiplexer 132 for output therefrom. If, however, data on both data lines 146 and 147 is a logic 0, then output of OR gate 104 will be a binary logic 0. Output of OR gate 104 being a logic 0 will select the lower order input, namely, data on data line input 145, of multiplexer 132 for output therefrom. Output from multiplexer 132 is a partial address, namely, "partial address signal 1(0)." Output from OR gate 104 is a partial address, namely, "partial address signal 1(1)." Notably, to derive the 1-detected for the next 8-bit segment stage, the two 1-detecteds may be OR'ed together.

The binary priority encoding algorithm for an input bits embodiment of the present invention, takes $2^n$ input bits ($2^{**}n$ input bus width) and produces n output bits (n output bus width) that represents the position of the most significant active bit in the $2^n$ input bits, where "n" in an integer. For example, with n=3, there are 8 input bits and 3 encoded output bits. The following pseudo-code based on VHDL describes an exemplary embodiment:

Divide the input bus into 2^(n-1) 2 bit busses

FOR j IN 0 TO (n**2)/2-1 LOOP
   the least significant partial address bit is the high bit of that bus
   addr_tmp(j)(0):=in(j*2+1);
   OR the two bits together, and save for later
   active(j):=in(j*2) OR in(j*2+1);
END LOOP;
   concatenate all of the OR results to create a new input bus
   Recursively recombine each 2 bit bus FOR i IN 1 TO n-1 LOOP
   step:=2**i;
   for one pass of an intermediary bus
   FOR j IN 0 TO ((n**2)/(2*step))-1 LOOP
     the ith partial address bit is the high bit of the new 2 bit bus
     addr_tmp(j*step)(i):=active(step*j+step/2);
     if the high bit of the new 2 bit bus is true, use the 'high' partial address calculated previously,
     otherwise, use the 'low' partial address calculated previously.
     discard the other partial address
     IF (active(step*j+step/2)='1') THEN
       addr_tmp(j*step)(i-1 DOWNTO 0):=
         addr_tmp(j*step+step/2)(i-1 DOWNTO 0);
     ELSE
       addr_tmp(j*step)(i-1 DOWNTO 0)
         addr_tmp(j*step)(i-1 DOWNTO 0);
     END IF;
     OR the two bits together
     active(step*j):=active(step*j) OR active(step*j+step/2);
   END LOOP;
   concatenate all of the OR results to create a new input bus
END LOOP;
   at least one of all of the input bits OR'd together is active
at_least_one_active:=active(0);
   the output address has been fully assembled from partial addresses
addr:=addr_tmp(0)((2**n)-1 DOWNTO 0);

Example of Binary Priority Encoding

An example data flow for a sample input bus of '00101101' on data input bus 139, where logic 0 at one end of the sample data string is the Most Significant Bit ("MSB") of the string, is used to determine the address of '101' in Table II below. Notably, any other bit sequence, other than the example shown, may be used. Table II goes from highest priority at the left of Table II to lowest priority at the right of Table II.

TABLE II

| Stage | 0 | Input bits | 00 | 10 | 11 | 01 |
|---|---|---|---|---|---|---|
| 0 | | [0] address bit | 0 | 1 | 1 | 0 |
| 1 | | 1 detected | 0 | 1 | 1 | 1 |
| 2 | | [1:0] address bits | | 01 | | 11 |
| 2 | | 1 detected | | 1 | | 1 |
| 3 | | [2:0] address bits | | | 101 | |
| 3 | | 1 detected | | | 1 | |

The eight bit sample is divided into four sets of two bits each, representing input data pairs 4 through 1, as previously described. Accordingly, for this example, the four pairs of bits are 00, 10, 11, and 01, as indicated in the first row of Table II, are respective input data pairs 4 through 1. Output of OR gates 104 through 101 respectively is logic 0, 1, 1, and 1, as indicated in the third row of Table II.

Data input to multiplexer 131 is logic 0 from input data line 141 and logic 1 from input data line 143. Data input to multiplexer 132 is logic 1 from input data line 145 and logic 0 from input data line 147. Data inputs to multiplexers 131 and 132 are indicated in the second row of Table II. Thus, it should be understood that the 8-bit input has been converted down to a 4-bit bus and 4 flag bits ("a flag"). The four flag bits are the outputs of OR gates 104 through 101. The 4-bit bus is four sets of a partial address for address [0], namely, the 0 1 1 0 in the second row in Table II. In other words, there are four possibilities for the 0 address bit. For example, consider that there are four memory quadrants, if address [0] is in the highest priority quadrant, then address [0] is logic 0; if address [0] is in the second highest priority quadrant, then address [0] is logic 1; if address [0] is in the third highest priority quadrant, then address [0] is logic 1; and if address [0] is in the lowest priority quadrant (the right most column in Table II), then address [0] is logic 0.

Control select signal input to multiplexer 131 is logic 1 from the output of OR gate 102, and control select input to multiplexer 132 is logic 0 from the output of OR gate 104. These 1-detected outputs from OR gates 102 and 104 are used to control data flow and indicate where to look for the address [0] bit. Accordingly, multiplexer 131 selects the higher priority bit line for output, namely, selects data on input data line 143 for output responsive to a logic 1 control select signal. Thus, for this example, multiplexer 131 outputs a logic 1. Multiplexer 132 on the other hand receives a logic 0 for the control select input, and thus selects the lower priority bit line for output, which in this example has a logic 1 data bit. Thus, in this example, there are two possible partial addresses for address bits [1:0], and they are 01 and 11 as indicated in the fourth row of Table II. These four bits for the two partial addresses are inputs to multiplexer 133.

Inputs to OR gate 111 are logic 1's, and inputs to OR gate 112 are a logic 0 and a logic 1. Accordingly, output of OR gate 111 is a logic 1, and output of OR gate 112 is a logic 1. These two outputs of OR gates 111 and 112 are indicated in the fifth row of Table II.

Output of OR gate 112 is provided as a control select signal to multiplexer 133. In this example, output from OR gate 112 is a logic 1, and thus the higher priority half of bits is selected for output. The higher priority half of bits to multiplexer 133 are the output of OR gate 104 and the output of multiplexer 132. Accordingly, for this example, output from multiplexer 133 are address [0] bit 151 and address [1] bit 152 which are logic 1 and logic 0, respectively. Had output of OR gate 112 been a logic 0, then the bottom two inputs, namely, output of multiplexer 131 and output of OR gate 102, would have been selected as outputs 151 and 152, respectively, from multiplexer 133.

The address [2] bit 153 is the output from OR gate 112, which in this example is logic 1. Thus, address [2:0] bits are logic 1, 0, and 1, respectively, as listed in the sixth row of Table II. Notably, the binary value of 101 is five, and the bit of highest priority is in location 5 (counting from zero) in the first row of Table II, namely, data bit input from input data line 145. Thus, the most significant bit in the data stream is at location 5. Accordingly, an input bus is obtained, and a binary encoding with priority is provided in one parallel processing step. Notably, more than one bit may be active, and aliasing may be reduced or avoided, with binary priority encoder 100.

Outputs of OR gate 111 and 112 are provided as input to OR gate 121. In this example, logic 1's are provided as input to OR gate 121, which produces a logic 1 output 154.

Figure 1B:
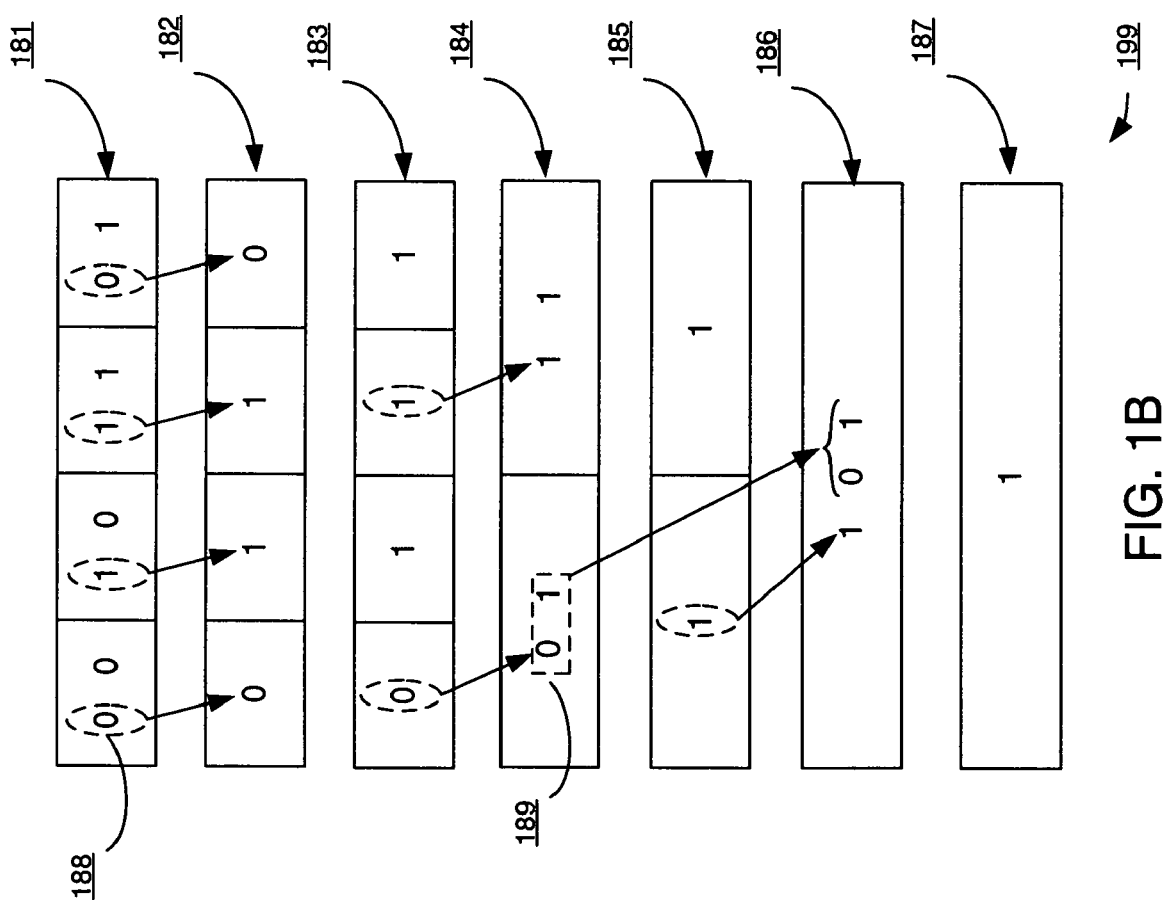
FIG. 1B is a block-flow diagram depicting an exemplary embodiment of bit flow for an example calculation for an 8-bit sample.

FIG. 1B is a block-flow diagram depicting an exemplary embodiment of bit flow 199 for the above-described example calculation for the 8-bit sample. Each row 181 through 187 of bits in bit flow 199 corresponds to those same bits in Table II. Dashed circles and associated arrows 188 indicate how bits are copied from one stage to the next. A dashed box and associated arrow 189 indicates bits selected for part of an output address.

Figure 1C:
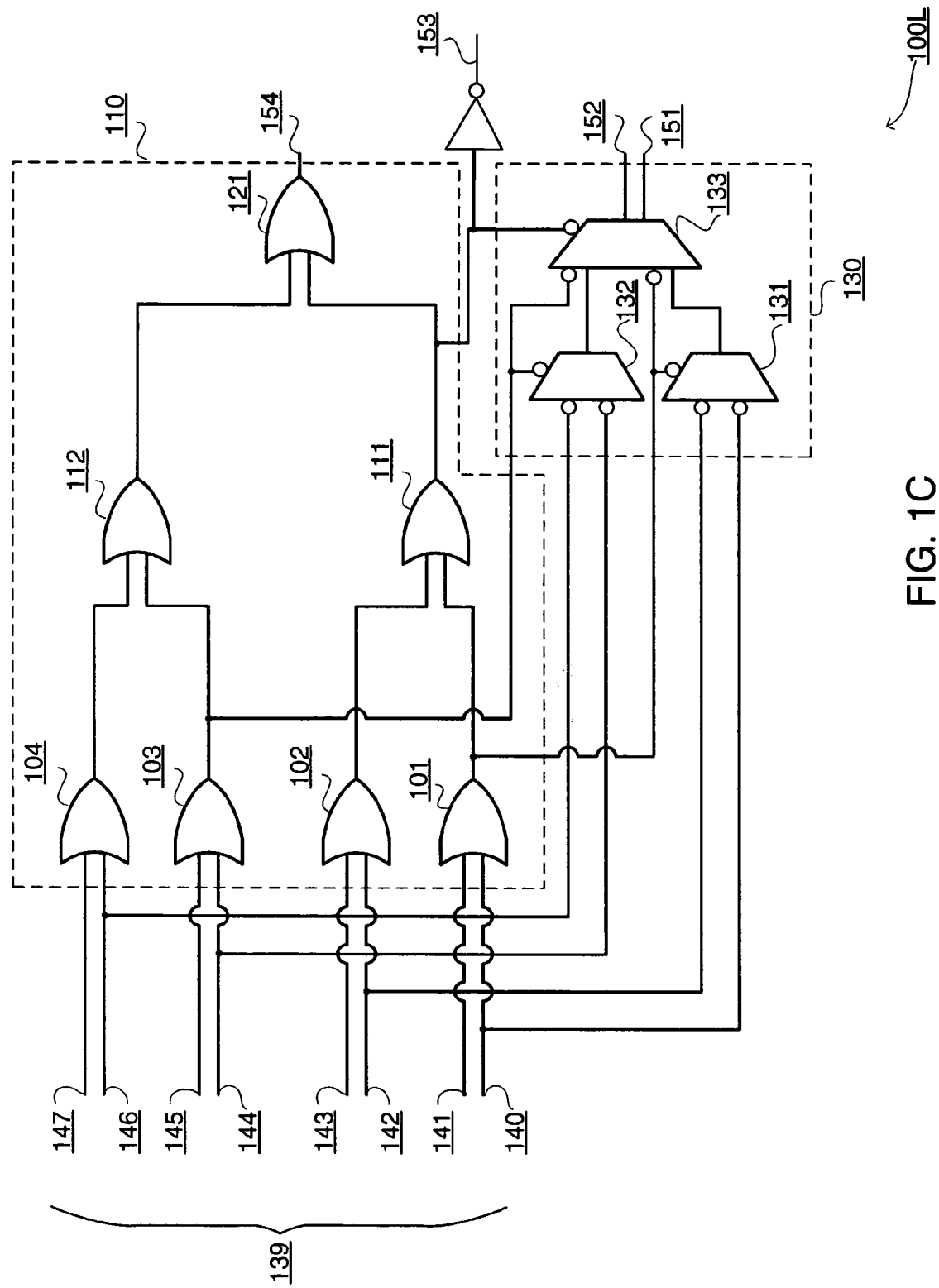
FIG. 1C is a schematic diagram depicting an exemplary embodiment of a binary priority encoder configured to provide priority to lower order bits.

FIG. 1C is a schematic diagram depicting an exemplary embodiment of binary priority encoder 100L. As binary priority encoder 100L has many of the same elements as binary priority encoder 100 of FIG. 1, description of the same elements is not repeated. Binary priority encoder 100L is configured to give priority to the lower order bits. For example, rather than input bit lines 141, 143, 145, and 147 being provided to multiplexer tree 130, input bit lines 140, 142, 144, and 146 are provided to multiplexer tree 130; and outputs from OR gates 101 and 103, and not outputs from OR gates 102 and 104, are provided as respective control select inputs to multiplexer tree 130. Data from input bit lines 140 and 142 is inverted prior to being provided to multiplexer 131, and data from input bit lines 144 and 146 is inverted prior to being provided as data input to multiplexer 132. Additionally, data from outputs of OR gates 101 and 103 is inverted prior to being provided as data input to multiplexer 133. Furthermore, output from OR gate 111 is inverted prior to being provided as address output 153. Notably, select signals to multiplexers 131, 132 and 133 are inverted. Alternatively, multiplexers 131, 132 and 133 could be configured as 0 1 (e.g., top input, bottom input) instead of 1 0, in which embodiment select signals to multiplexers 131, 132 and 133 would not be inverted. Other embodiments by inversion or changing multiplexer input order are possible.

Figure 2:
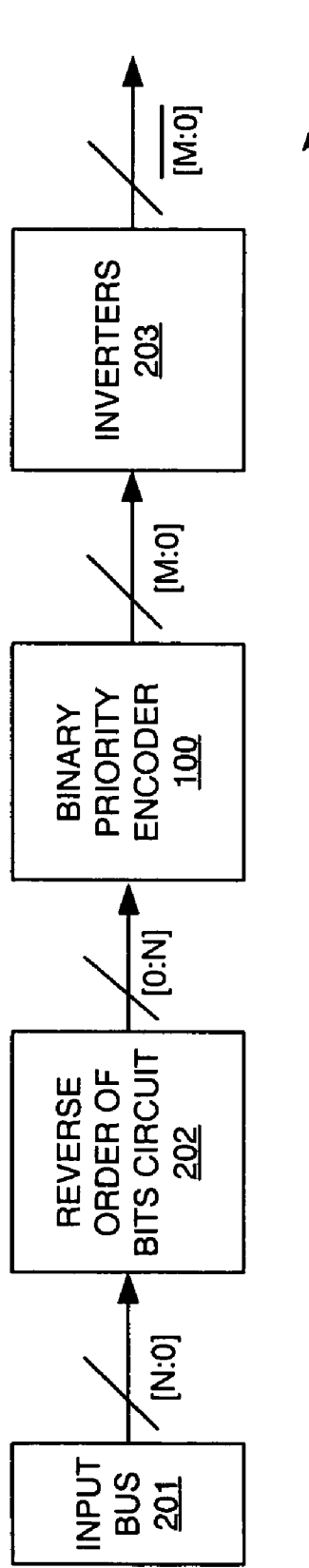
FIG. 2 is a block diagram depicting an exemplary embodiment of a binary low address priority encoder.

Alternatively, binary priority encoder 100 may be used for low address priority. FIG. 2 is a block diagram depicting an exemplary embodiment of a binary low address priority encoder 200. Data bits [N:0] for N an even integer greater than two are provided from input bus 201 to reverse order of bits circuit 202. Reverse order of bits circuit 202 outputs data bits [N:0] in a reverse order, namely, [0:N], which is provided as data input to binary priority encoder 100. Output from binary priority encoder 100 in response to data bits [0:N] are address bits [M:0] for M a positive integer less than N. Address bits [M:0] are respectively input to one or more inverters 203 for inversion to provide an inverted address, namely, [M:0] bar.

Figure 3:
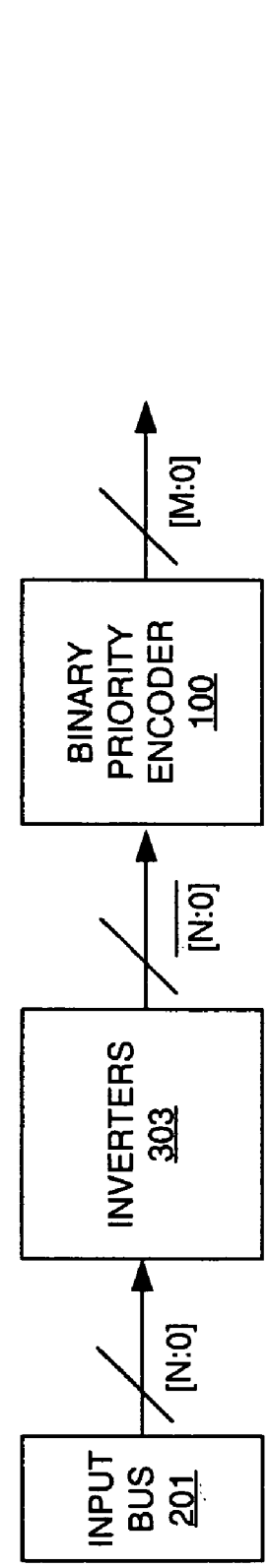
FIG. 3 is a block diagram depicting an exemplary embodiment of an active low binary priority encoder.

Notably, it has been assumed that the active bits are logic 1's. However, the active bits may be logic 0's. FIG. 3 is a block diagram depicting an exemplary embodiment of an active low binary priority encoder 300. Data bits [N:0] are obtained from input bus 201 and provided to respective inverters 303. Outputs from inverters 303 are inverted data bits, namely, data bits [N:0] bar. These inverted data bits are provided as data input to binary priority encoder 100, which in response provides address bits [M:0] as output.

Figure 4A:
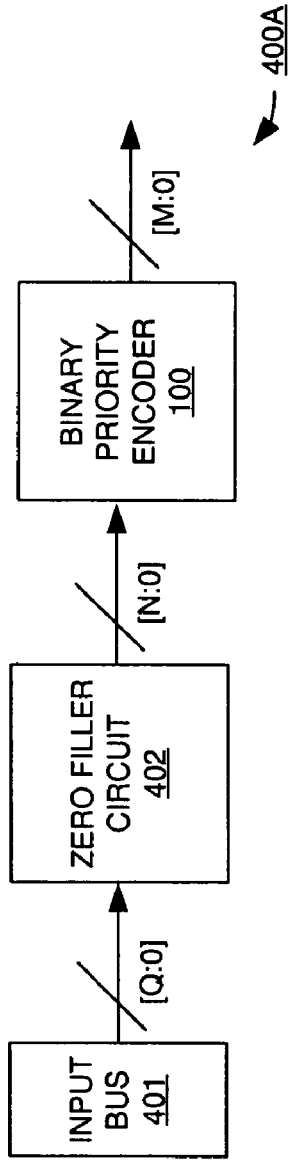
FIG. 4A is a block diagram depicting an exemplary embodiment of a binary priority encoder for a non-power of two data input and for high address priority.

It has been assumed that the data input to priority encoder 100 is a power of two in length. However, non-power of two data input may be used. FIG. 4A is a block diagram depicting an exemplary embodiment of a binary priority encoder 400A for a non-power of two data input and for high address priority. Data [Q:0] for Q a non-power of two is obtained from input bus 401 and provided to zero filler circuit 402. Zero filler circuit 402 is configured to zero pad high priority bits for high address priority to provide zero padded data bits [N:0] for N an integer power of two greater than Q. Thus, data bits [N:0] include data bits [Q:0] as well as one or more zero padding bits. Zero padded data bits [N:0] are data input for binary priority encoder 100 which in turn produces binary priority encoded address bits [M:0].

Figure 4B:
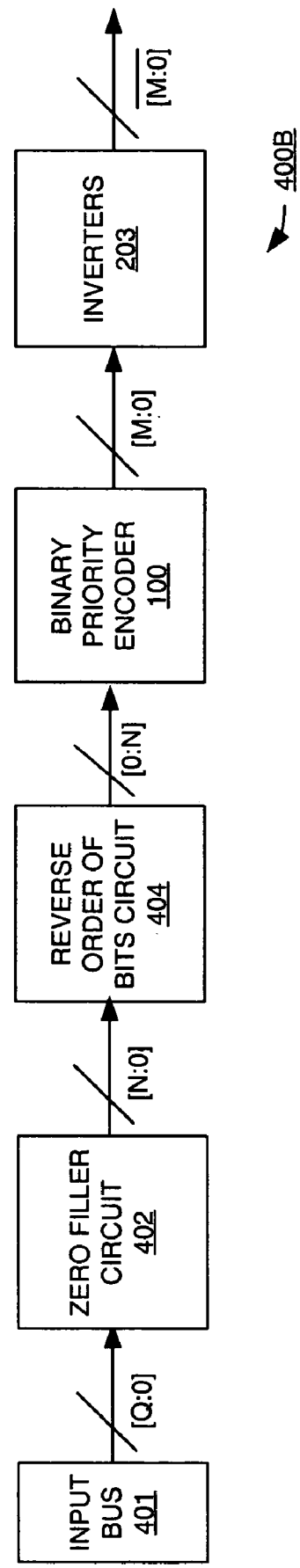
FIG. 4B is a block diagram depicting an exemplary embodiment of a binary priority encoder for a non-power of two data input and for low address priority.

FIG. 4B is a block diagram depicting an exemplary embodiment of a binary priority encoder 400B for a non-power of two data input and for low address priority. Data [Q:0] for Q a non-power of two is obtained from input bus 401 and provided to zero filler circuit 402. Zero filler circuit 402 is configured to zero pad high priority bits for high address priority to provide zero padded data bits [N:0] for N an integer power of two greater than Q. Thus, data bits [N:0] include data bits [Q:0] as well as one or more zero padding bits.

Zero padded data bits [N:0] are provided to reverse order of bits circuit 404. Reverse order of bits circuit 404 outputs data bits [N:0] in a reverse order, namely, [0:N], which is provided as data input to binary priority encoder 100. Output from binary priority encoder 100 in response to data bits [0:N] are address bits [M:0] for M a positive integer less than N. Address bits [M:0] are respectively input to one or more inverters 203 for inversion to provide an inverted address, namely, [M:0] bar.

Accordingly, a binary priority encoder using partial addresses to generate a binary encoded address from priority encoded data on a data input bus has been described. It should be understood that the single-step binary priority encoder as described herein reduces calculation latency in comparison to two or more step binary encoding. Furthermore, such calculation latency is reduced with reduced circuitry overhead in comparison to some multiple step binary encoders.

Figure 5:
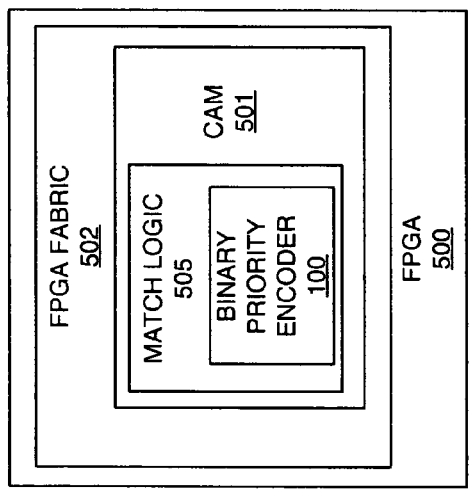
FIG. 5 is a block diagram depicting an exemplary embodiment of a Field Programmable Gate Array ("FPGA").

The binary priority encoder described herein may be used for applications where a binary address of a bus with one or more active bits needs to be determined, such as match address generation inside a content addressable memory ("CAM"). FIG. 5 is a block diagram depicting an exemplary embodiment of a Field Programmable Gate Array ("FPGA") 500. FPGA 500 includes configurable circuitry ("FPGA Fabric 502") as is known. Instantiated in FPGA Fabric 502 is CAM 501 of FPGA 500. Notably, optionally CAM 501 may be instantiated outside of FPGA Fabric 502 though within FPGA 500. Moreover, it should be understood that CAM 501 may be instantiated in any known integrated circuit using a CAM, and need not be instantiated in FPGA

500. Match logic 505 is part of CAM 501, and CAM 501 is an embedded core in FPGA Fabric 502. Match logic 505 includes binary priority encoder 100. For this type of encoding, priority of bits on an input bus are first determined by the binary priority encoder to avoid or reduce aliasing with address generation. Increasing efficiency of match logic 505 via binary priority encoder 100 facilitates higher clock speeds and reduces read latency. Additionally, binary priority encoder 100 facilitates increasing the number of memory locations with binary addressing in CAM 501. Notably, FPGA devices from Xilinx, Inc. of San Jose, Calif. are particularly useful due to their use of multiplexers in their slice architecture. In particular, F5 through F8 multiplexers in Xilinx, Inc. FPGAs are two input multiplexers that may be used to provide a multiplexer tree as described herein. The existence of such multiplexers as part of the slice architecture reduces routing utilization, i.e., no additional routing between different multiplexer stages is needed, which in turn reduces computational load for place and route tools.

Again, it should be appreciated that any data on an input bus may be used having binary values which are to be encoded with some priority. Additionally, no clocking of binary priority encoder 100 is needed.

Figure 6:
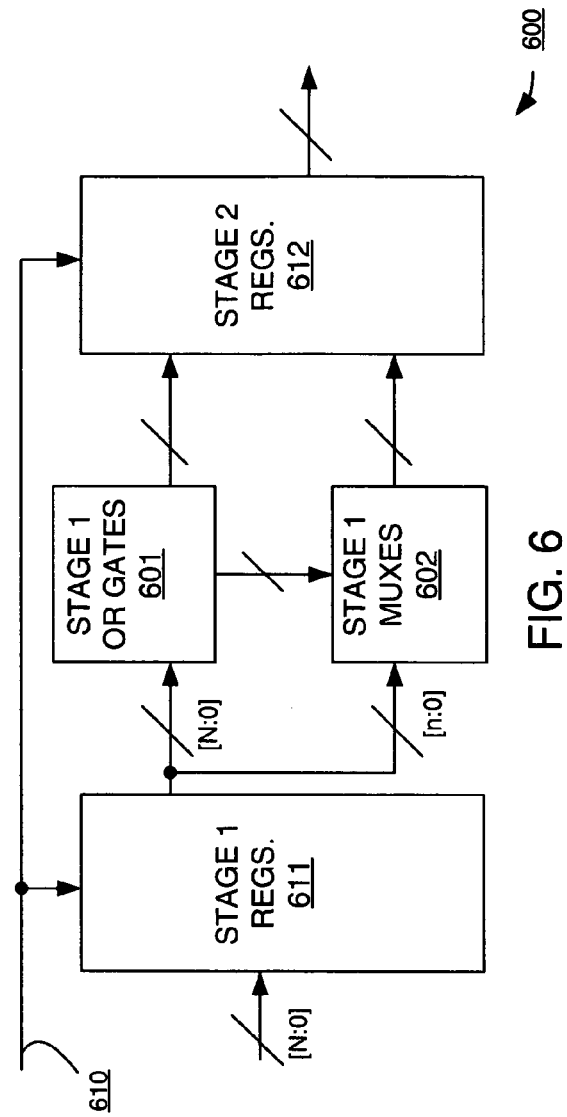
FIG. 6 is a block diagram depicting an exemplary embodiment of a portion of a pipelined binary priority encoder.

Notably, if an increase in latency is tolerable for increased cycle time, a pipelined version of a binary priority encoder may be used as clocked registers may be inserted at any stage of binary priority encoder 100. FIG. 6 is a block diagram depicting an exemplary embodiment of a portion of a pipelined binary priority encoder 600. Same features of pipelined binary priority encoder 600 as those of binary priority encoder 100 of FIG. 1A are not repeated here for purposes of clarity. With continuing reference to FIG. 6 and renewed reference to FIG. 1A, pipelined binary priority encoder 600 is further described.

Data input [N:0] is clocked into and out of stage 1 registers 611 responsive to clock signal 610. Output data [N:0] from stage 1 registers 611 is provided to stage 10R gates 601 such as of an OR tree 110, and a portion of output data [N:0], namely, output data [n:0] for n one-half of N, is provided to stage 1 multiplexers 602 such as of a multiplexer tree 130. Outputs of stage 10R gates 601 and stage 1 multiplexers 602 are clocked into and out of stage 2 registers 612 responsive to clock signal 610. Notably, though only two stages are illustratively shown, additional stages as in binary priority encoder 100 may be added, and those stages may have registers added to them as well.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners. Additionally, the headings herein are for the convenience of the reader and are not intended to limit the scope of one or more aspects of the invention.

What is claimed is:

1. An apparatus for binary priority encoding, comprising:
   a data input bus;
   a first logic tree coupled to receive data from the input bus;
   a second logic tree coupled to receive a portion of the data from the input bus;
   the first logic tree configured to provide a flag signal indicating whether at least one bit of the data is active;
   the first logic tree configured to provide control signals;
   the second logic tree coupled to receive the control signals;
   the second logic tree configured to select first partial addresses from the portion of the data responsive to the control signals; and
   the control signals further provided to the second logic tree as second partial addresses;
   wherein the first logic tree and the second logic tree in combination provide a binary priority encoder.

2. The apparatus, according to claim 1, wherein one of the control signals is provided as an address bit output.

3. The apparatus, according to claim 2, wherein the one of the control signals is provided to the second logic tree to select as between the first partial addresses and the second partial addresses address bit outputs.

4. The apparatus, according to claim 3, wherein the first logic tree is an OR gate tree.

5. The apparatus, according to claim 4, wherein the second logic tree is a multiplexer tree.

6. The apparatus, according to claim 3, wherein the first logic tree is configured for giving priority to a lowest address.

7. The apparatus, according to claim 3, wherein the first logic tree is configured for giving priority to a highest address.

8. The apparatus, according to claim 7, further comprising a bit order reversal circuit coupled between the data input bus and the binary priority encoder and configured to reverse bit order of the data.

9. The apparatus, according to claim 8, further comprising inverters coupled to receive the address bit output and the address bit outputs and configured to invert the address bit output and the address bit outputs.

10. The apparatus, according to claim 1, further comprising inverters coupled between the data input bus and the binary priority encoder and configured to invert the data provided to the binary priority encoder.

11. The apparatus, according to claim 1, further comprising a zero padding circuit coupled between the data input bus and the binary priority encoder and configured to zero pad the data to provide zero padded data to the binary priority encoder.

12. The apparatus, according to claim 11, further comprising a bit order reversal circuit coupled between the zero padding circuit and the binary priority encoder and configured to reverse bit order of the zero padded data for the binary priority encoder.

13. The apparatus, according to claim 12, further comprising inverters coupled to receive the address bit output and the address bit outputs and configured to invert the address bit output and the address bit outputs.

14. The apparatus, according to claim 1, wherein the binary priority encoder provides the address bit output and the address bit outputs within one operation by parallel processing the data through the first logic tree and the second logic tree with flow control of the data provided with the control signals.

15. An integrated circuit for binary encoding, comprising:
   content addressable memory;
   match logic coupled to the content addressable memory, the match logic including a binary priority encoder;
   the binary priority encoder including:
      a data input bus;
      a first logic tree coupled to receive data from the input bus;

a second logic tree coupled to receive a portion of the data from the input bus;

the first logic tree configured to provide a flag signal indicating whether at least one bit of the data is active;

the first logic tree configured to provide control signals;

the second logic tree coupled to receive the control signals;

the second logic tree configured to select first partial addresses from the portion of the data responsive to the control signals; and the control signals further provided to the second logic tree as second partial addresses.

16. The integrated circuit, according to claim 15, wherein the binary priority encoder is configured from configurable logic.

17. The integrated circuit, according to claim 16, wherein the configurable logic is part of a Field Programmable Gate Array.

18. The integrated circuit, according to claim 15, wherein the first logic tree and the second logic tree are divided into stages.

19. The integrated circuit, according to claim 18, further comprising at least one stage of registers disposed adjacent to stages of the first logic tree and the second logic tree for pipelined operation of the binary priority encoder.

20. The integrated circuit, according to claim 15, wherein the second logic tree is a multiplexer tree.

21. The integrated circuit, according to claim 15, wherein the first logic tree is an OR gate tree.

22. The integrated circuit, according to claim 15, wherein the binary priority encoder is configured for high order bit priority.

23. The integrated circuit, according to claim 15, wherein the binary priority encoder is configured for low order bit priority.

24. The integrated circuit, according to claim 15, wherein the binary priority encoder is configured to zero pad.

25. The integrated circuit, according to claim 15, wherein the binary priority encoder is configured as an active low encoder.

26. The integrated circuit, according to claim 15, wherein the binary priority encoder comprises inverters for inverting the data to provide the active low encoder.

27. The integrated circuit, according to claim 15, wherein the binary priority encoder is configured as an active high encoder.

* * * * *